Dec. 12, 1933.    S. PATT    1,939,362
MACHINE FOR FORMING DOUGH PRODUCTS
Filed March 18, 1933    9 Sheets-Sheet 1

Inventor
Sylvester Patt
By Clarence A. O'Brien
Attorney

Dec. 12, 1933.   S. PATT   1,939,362
MACHINE FOR FORMING DOUGH PRODUCTS
Filed March 18, 1933   9 Sheets-Sheet 2

Inventor
Sylvester Patt
By Clarence A. O'Brien
Attorney

Dec. 12, 1933.  S. PATT  1,939,362
MACHINE FOR FORMING DOUGH PRODUCTS
Filed March 18, 1933  9 Sheets-Sheet 3

Inventor
Sylvester Patt
By Clarence A. O'Brien
Attorney

Dec. 12, 1933.  S. PATT  1,939,362
MACHINE FOR FORMING DOUGH PRODUCTS
Filed March 18, 1933  9 Sheets-Sheet 5

Inventor
Sylvester Patt
By Clarence A. O'Brien
Attorney

Dec. 12, 1933.    S. PATT    1,939,362
MACHINE FOR FORMING DOUGH PRODUCTS
Filed March 18, 1933    9 Sheets-Sheet 7

Inventor
Sylvester Patt
By Clarence A. O'Brien
Attorney

Dec. 12, 1933.   S. PATT   1,939,362
MACHINE FOR FORMING DOUGH PRODUCTS
Filed March 18, 1933   9 Sheets-Sheet 8

Inventor
Sylvester Patt
By Clarence A. O'Brien
Attorney

Dec. 12, 1933.    S. PATT    1,939,362
MACHINE FOR FORMING DOUGH PRODUCTS
Filed March 18, 1933    9 Sheets-Sheet 9

Inventor
Sylvester Patt
By Clarence A. O'Brien
Attorney

Patented Dec. 12, 1933

1,939,362

UNITED STATES PATENT OFFICE 1,939,362

MACHINE FOR FORMING DOUGH PRODUCTS

Sylvester Patt, Willoughby, Ohio

Application March 18, 1933. Serial No. 661,599

5 Claims. (Cl. 107—22)

This invention relates to a machine for forming dough products, such as long-cut and short-cut macaroni, gnocchi, ravioli and the like, the general object of the invention being to provide supporting means for supporting various kinds of rollers and knives for forming the products, with means whereby the rollers and knives can be readily substituted one for another, according to the product to be formed.

This invention also consists in certain other features of construction and in the combination and arrangement of the several parts, to be hereinafter fully described, illustrated in the accompanying drawings and specifically pointed out in the appended claims.

In describing the invention in detail, reference will be had to the accompanying drawings wherein like characters denote like or corresponding parts throughout the several views, and in which:—

In these drawings, the numeral 1 indicates a base for resting on a table top or other support and having a substantially U-shaped clamping member 2 slidably arranged in a perforation in a depending lug 3 on the base and carrying a clamping screw 4 for clamping the base to a table top 5, as shown more particularly in Figures 30 to 33.

A frame A, formed of the two end members 6, is suitably fastened to the base and has bearings formed in its top portions for the trunnions of a main roller 7 formed of any suitable material, either wood or metal, and one trunnion is extended to receive the small gear 8 and the larger gears 9 and said trunnion is also shaped to receive a crank handle 10. A scraper blade 11 is formed with a tubular part 12 through which a long bolt 13 passes which connects the blade to a part of the frame, with the blade engaging the roller 7, as shown more particularly in Figure 4.

Figure 1:
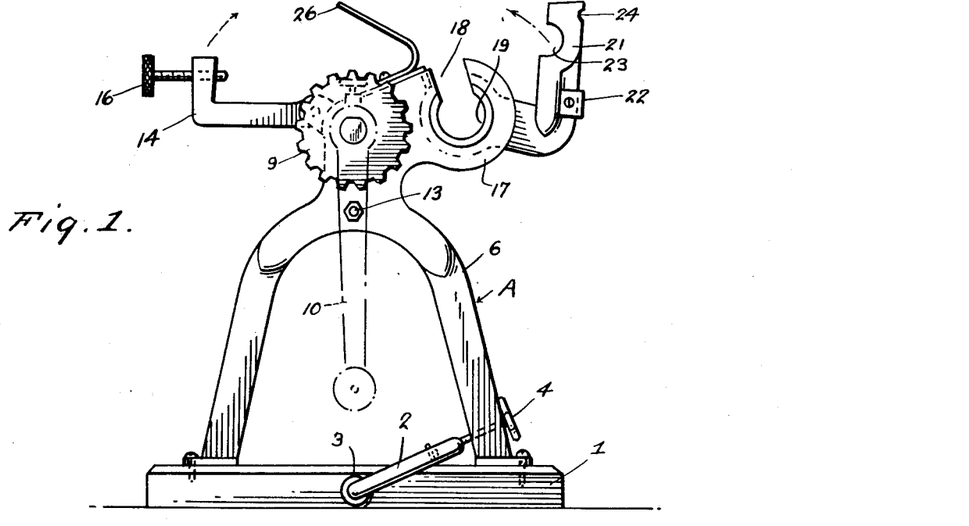
Figure 1 is an end view of the machine in open position, with all the parts removed excepting the main roller.
Figures 2, 28:
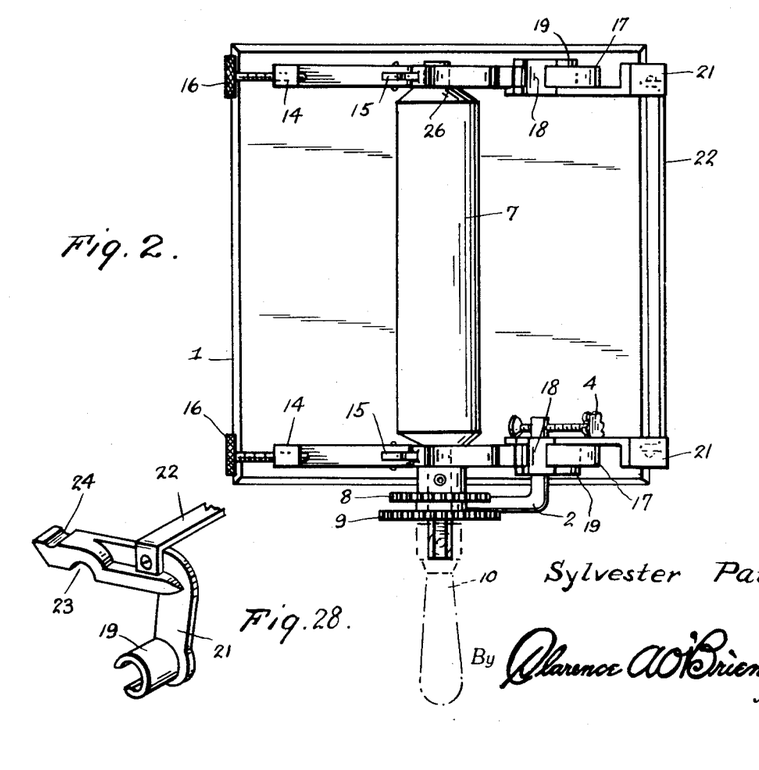
Figure 2 is a plan view of Figure 1.
Figure 28 is a fragmentary perspective view of the latch member for holding the top roller and the side roller or device in the frame.

A pair of L-shaped arms 14 is pivoted to the frame, one at each end thereof, as shown at 15, and a clamping screw 16 is carried by the short limb of each arm. These arms can be swung from the position shown in Figure 1 to a vertical position. Each end member has a ring-shaped extension 17 extending slightly upwardly and outwardly from the top thereof and this extension is formed with a slot 18. A split bushing or sleeve 19 fits in each member 17 and has its slot of the same width as the slot 18 and these sleeves 19 are carried by the substantially L-shaped members 21 which are connected together by the bar 22 and the free limb of each member 21 is formed with a bearing recess 23 in its under part and a groove 24 in its upper part. This assembly, composed of the arms 21 and the bar 22 and the sleeves 19, is rotatably supported in the members 17 and when swung downwardly from the position in Figure 1, the recesses 23 will be located above the axis of the roller 7. The recesses 23 are adapted to receive the trunnions of a roller 25 and to hold the trunnions against the leaf springs 26 of substantially U-shape and each having one limb attached to the top of an end member 6 of the frame A. After the roller 25 has been put in place and the members 21 swung into the position they occupy in Figure 3, the arms 14 are raised and the screws 16 turned until they engage the recesses 24 and by adjusting these screws the springs 26 will be tensioned and the roller 25 can be adjusted to either contact the roller 7 or be spaced a desired distance therefrom. This roller 25 is provided with a gear 27 at one end thereof to engage the gear 8.

Figure 3:
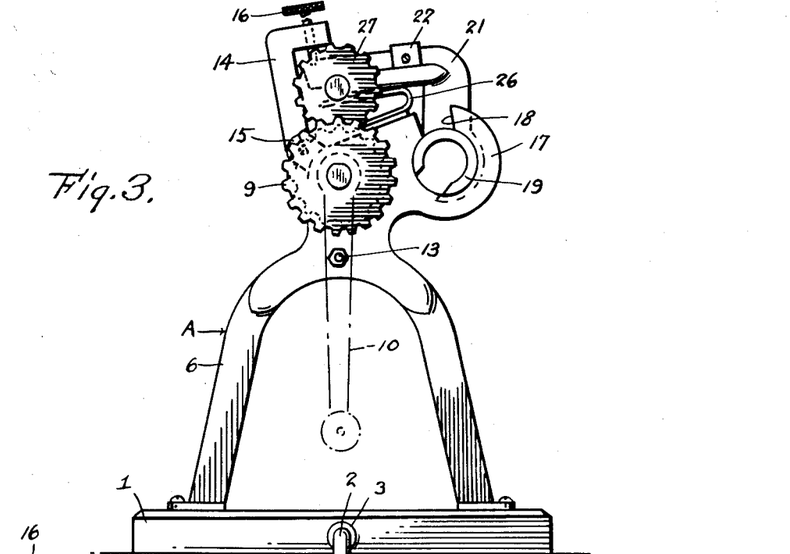
Figure 3 is an end view showing the machine closed and supporting the two plain rollers.
Figure 4:
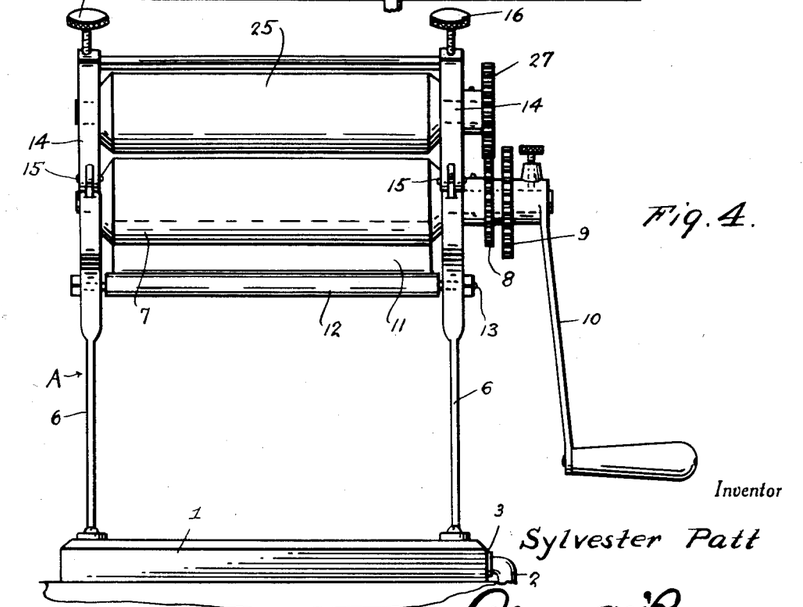
Figure 4 is a front view of Figure 3.

Thus with the two plain rollers 7 and 25 in the machine, as shown in Figures 3 and 4, dough can be fed between the rollers as the same are being rotated by the handle 10, so that the dough will be kneaded and rolled into a sheet.

Figure 9:
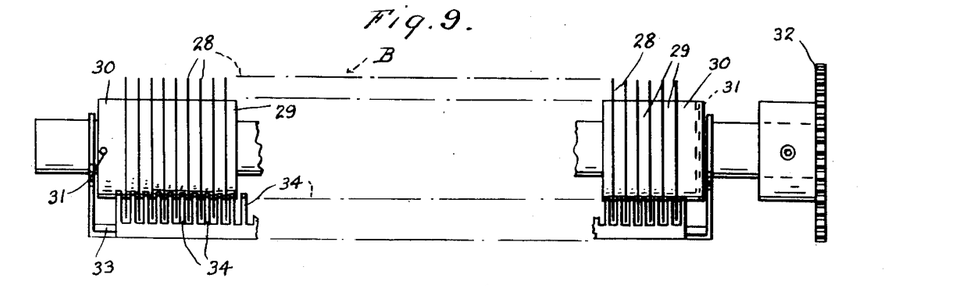
Figure 9 is a view of the knife carrying roller for cutting long macaroni.
Figures 10, 11, 12, 13, 14, 15:
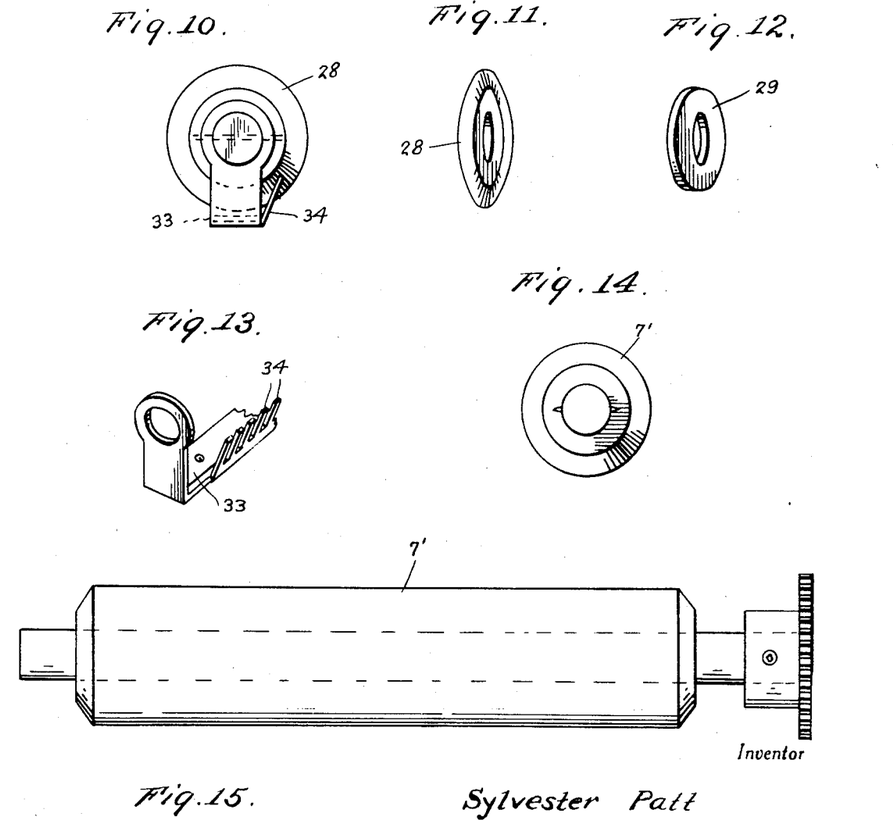
Figure 10 is an end view of Figure 9.
Figure 11 is a view of one of the knives.
Figure 12 is a view of one of the spacers.
Figure 13 is a fragmentary view of the scraper member.
Figure 14 is an end view of the wooden roller which may be used as the main roller.
Figure 15 is an elevation of this roller.

When the dough is to be cut into long lengths of macaroni, for instance, the roller 25 is removed, after the dough has been rolled into sheets, by loosening the screws 16 and swinging the arms 14 downwardly and then swinging the arms 21 upwardly and outwardly which will enable the roller 25 to be removed. Then a roller B, shown in Figure 9, is substituted for the roller 25 and as will be seen, this roller B is provided with a plurality of disk cutters 28 spaced apart by the spacers 29, collars 30 holding the disks and spacers on the roller and these collars are pinned to the roller, as shown at 31. This roller B is also provided with a gear 32 for engaging one of the gears 8 or 9, so that the knife carrying roller B will be rotated when the handle is turned. If desired, a wooden roller, such as that shown at 7' in Figures 14 and 15, may be substituted for the roller 7 when said roller 7 is formed of metal. The screws 16 should be adjusted so as to cause the cutters 28 to come in contact with the rollers 7 or 7', and as will be seen, as the dough is fed between the rollers, the cutters 28 will cut it into strips.

In order to prevent the strips from being carried around with the roller B, I provide the yoke member 33 which is swung from the trunnions of the roller B and as the upstanding teeth 34 thereon for fitting between the disk cutters, as shown in Figure 9.

Figure 5:
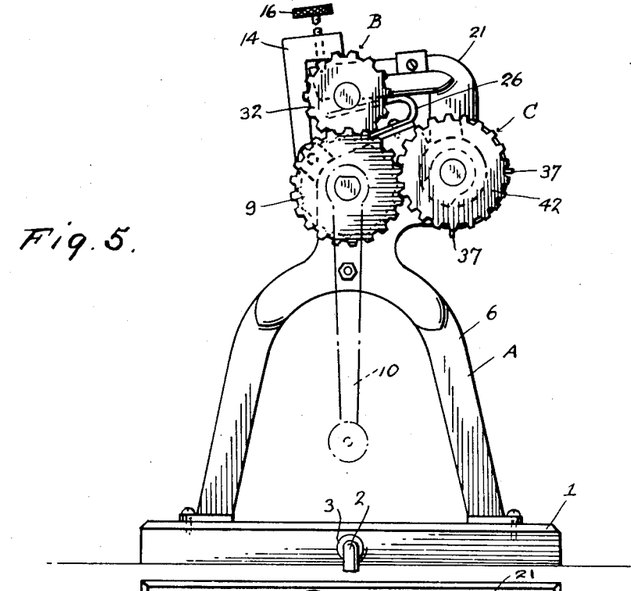
Figure 5 is an end view of the machine arranged to cut short macaroni.
Figure 6:
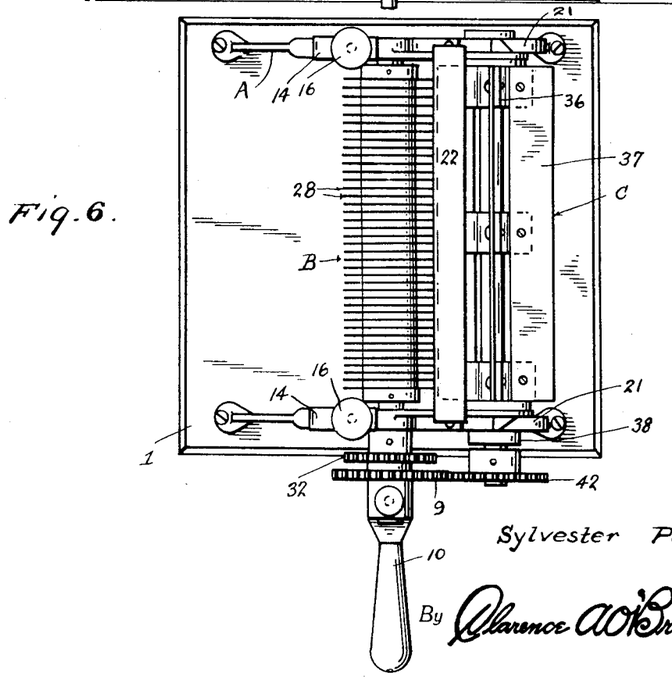
Figure 6 is a plan view of Figure 5.

When short-cut macaroni is desired, a cutter member C is used in the machine, as shown in Figures 5 and 6. As shown in Figures 22 to 27, this cutter member comprises a shaft 35 having a number of flanged hubs 36 attached thereto, to the flanges of which the blades 37 are attached. A pair of bushings 38 (see Figure 24) are slipped on the ends of this shaft and then these bushings are placed in the openings in the members 17 and the sleeves 19, each bushing having a pair of oppositely arranged flat sides 39 which enables the bushing to be passed through the slot 18 into the sleeve 19 and then by turning the bushing by means of its knurled flange 40, the bushing will be locked in place by means of the projections 41 carried thereby. By using the sleeves 19 on the members 21, these members can be partly rotated in the members 17 while the bushings are in position. The shaft 35 is provided with a gear 42 for engaging the gear 9 of the shaft 7 or 7' so that the cutter C will be rotated from the handle 10. This arrangement is shown in Figures 5 and 6 and as will be seen as the dough is fed between the cutter roller B and the roller 7 or 7' it will be cut into strips and then as the blades 37 of the cutter C contact the strips, said strips will be cut into short lengths, so that short-cut macaroni will be formed.

Figures 7, 40:
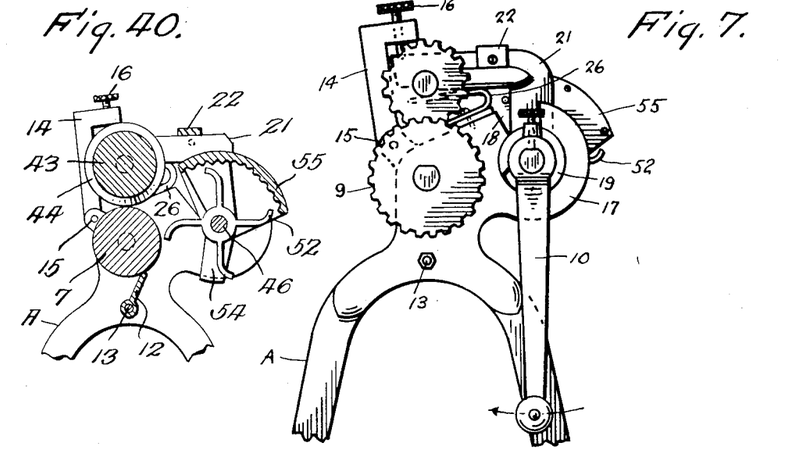
Figure 7 is an end view showing the parts arranged to form gnocchi.
Figure 40 is a vertical sectional view through Figure 8.
Figure 8:
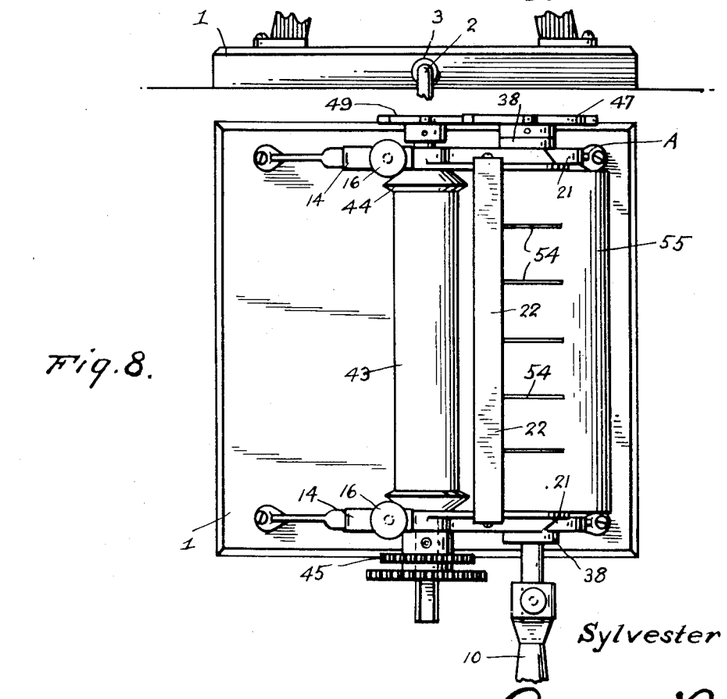
Figure 8 is a plan view of Figure 7.
Figure 16:
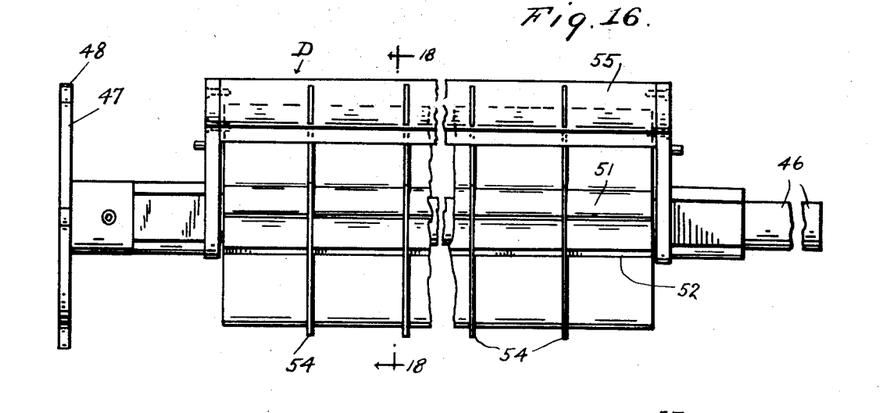
Figure 16 is a view of the roller and hood used with the machine in forming gnocchi.
Figures 17, 18, 19, 20, 21:
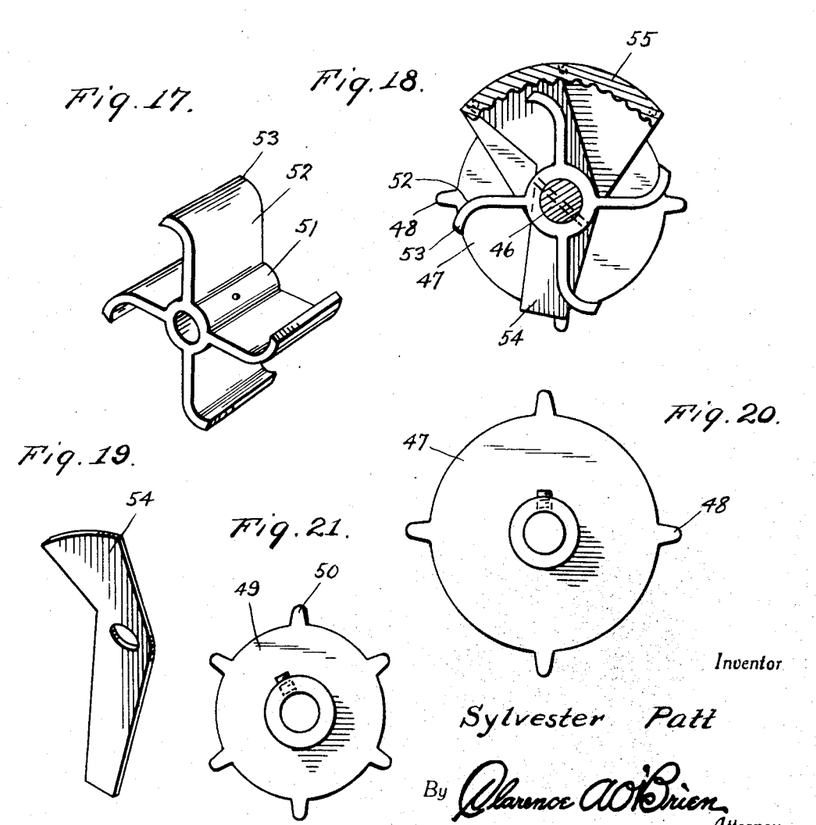
Figure 17 is a view of one of the wing assemblies used on said roller.
Figure 18 is a section on line 18—18 of Figure 16.
Figure 19 is a view of the combined spacer and cutter.
Figure 20 is a view of the toothed disk attached to one end of the roller.
Figure 21 is a view of the toothed disk engaged by the disk shown in Figure 20, used on the top roller of the machine.
Figure 22:
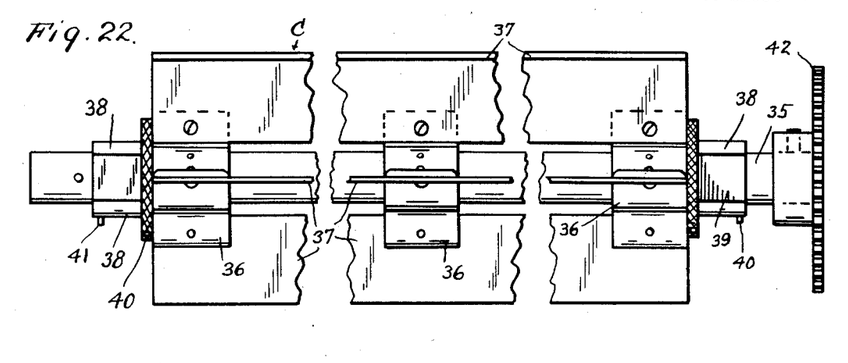
Figure 22 is a view of the knife roller used for short-cut macaroni.
Figure 23:
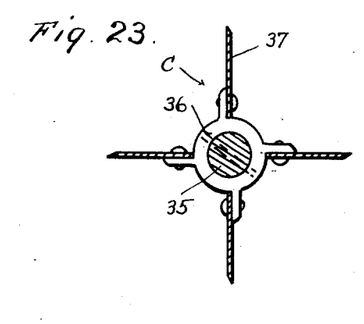
Figure 23 is a sectional view through said knife.
Figures 24, 25, 26:
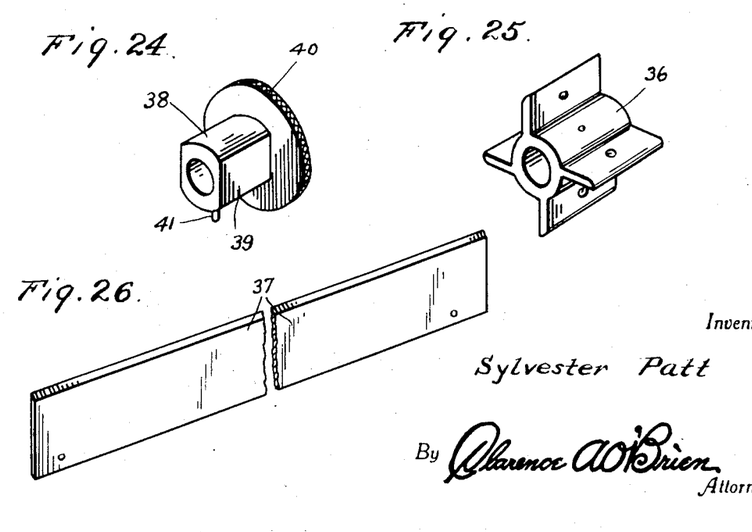
Figure 24 is a view of one of the bushings.
Figure 25 is a view of a hub member used with the roller shown in Figure 22.
Figure 26 is a view of one of the blades.
Figure 27:
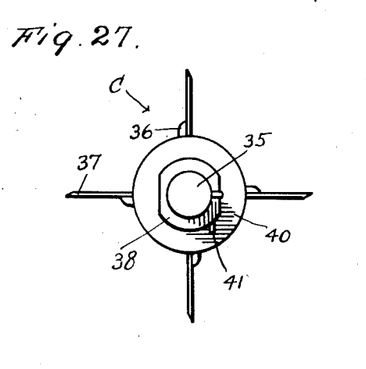
Figure 27 is an end view of the roller shown in Figure 22.
Figure 29:
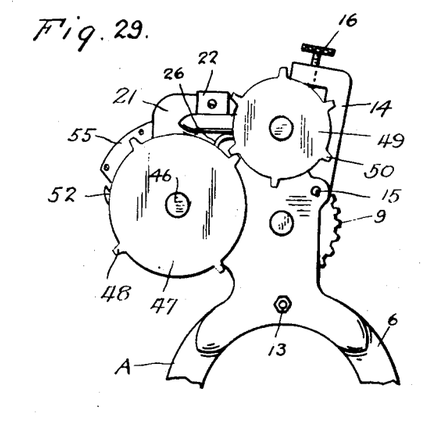
Figure 29 is an end view of the machine used for forming gnocchi.
Figures 30, 31, 33, 34:
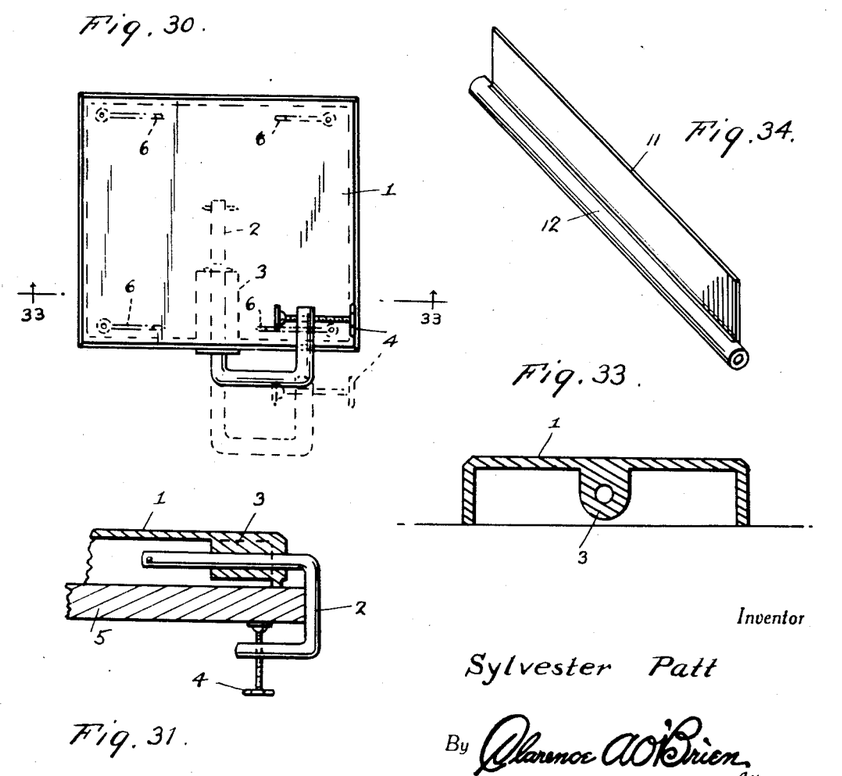
Figure 30 is a top plan view of the base for the machine.
Figure 31 is a detail sectional view showing how the base is clamped to a support.
Figure 33 is a section on line 33—33 of Figure 30.
Figure 34 is a view of the scraper blade.
Figure 32:
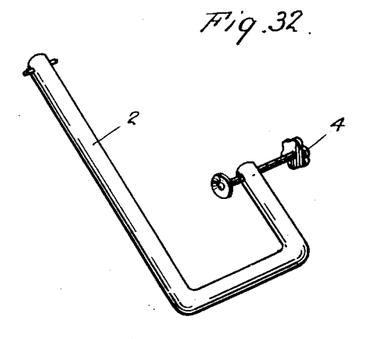
Figure 32 is a view of the clamp.
Figure 35:
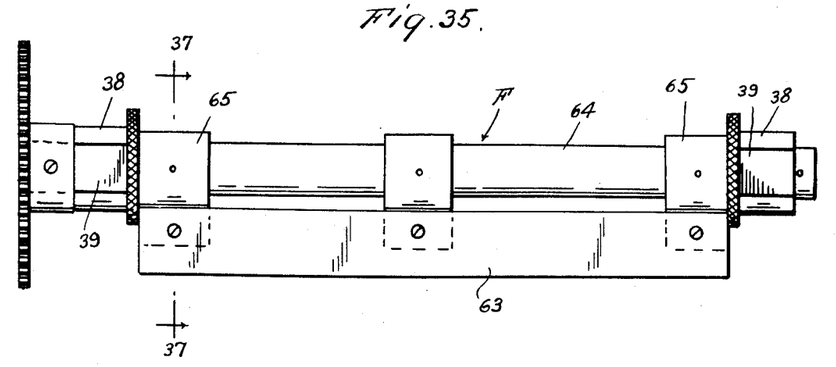
Figure 35 is a view of the single blade carrying roller used with the machine when the same is used for making ravioli.
Figure 36:
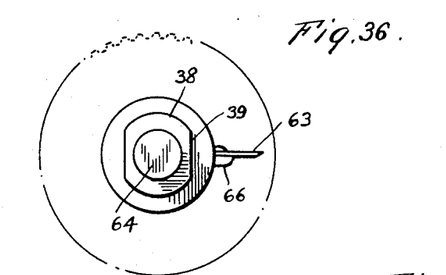
Figure 36 is an end view of Figure 35, with the gears shown in dotted lines.
Figure 37:
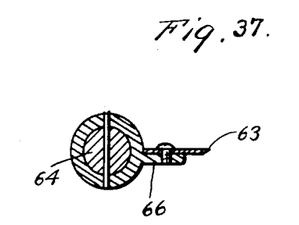
Figure 37 is a section on line 37—37 of Figure 35.

When the machine is to be used for making gnocchi, as shown in Figures 7 and 8, a roller 43 provided with the end flanges 44, is placed in the bearings 23 of the arms 21 with its flanges engaging portions of the roller 7, with the gear 45 of the roller 43 meshing with the gear 8 of the roller 7. A device shown generally at D in Figures 16 and 18 is then placed in the members 17 and held therein by the bushings 38 placed on its shaft 46. One end of the shaft 46 is extended to receive the handle 10, as shown in Figures 7 and 8. The opposite end of the shaft 46 has a disk 47 thereon which is provided with the projections 48 and a disk 49, of smaller diameter than the disk 47, is connected to a trunnion of the roller 43. The disk 49 has a greater number of projections 50 than has the disk 47 and as the roller 43 is driven from the device D through means of the projections 48 and 50 on the disks 47 and 49, the sheet of dough fed by the rollers 43 and 7 will pass from between the rollers very slowly and due to the flanges 44, this dough will be relatively thick. The shaft 46 of the device D has a plurality of hubs 51 fastened thereto, each hub having a number of radiating wings 52 thereon, the outer ends of which are curved, as shown at 53, with their end edges beveled. These members 51—52 are separated by the combined spacers and knives 54 which are substantially L-shaped, with the shorter arms extending upwardly at an angle and of greater width than the long downwardly extending arms, as will be seen from Figure 19. A substantially yoke-shaped hood 54 has its limbs supported from the shaft, with its bight of arcuate shape and having its internal wall corrugated, as shown in Figure 18 and this hood is so located that the upper short arms of the knives 54 are located therein.

Thus as the handle 10 is turned in the direction shown by the arrow in Figure 7, the device D will be rotated, which in turn rotates the roller 43 through means of the disks 47 and 49 and the roller 43 will rotate the roller 7 through means of the gears 45 and 8. Thus the dough will be fed between the rollers and then it will be engaged by the device D, which will form it into gnocchi.

As the sheet of dough passes from between the rollers 7 and 43, it will be engaged by the wings 52 which are revolving in clockwise direction and these wings will pick up the dough and press it against the corrugated under side of the member 55. As portions of the sheet contact the upper portions of the knives 54, the sheet will be cut longitudinally so that the sheet is divided into strips and these strips will be cut transversely into pieces by the beveled edges 53 forcing the dough against the forward portion of the member 55. These pieces are pressed against the corrugated face of the member 55 by the curved portions of the wings and the corrugated face will tend to prevent movement of the pieces of dough and at the same time the dough is being pressed out into a thin sheet, whereby the dough will tend to curl over the beveled gear edge of the wing and thus the piece of dough engaged by each wing will assume a spiral shape. The spirally shaped pieces of dough are finally dropped by the wings as said wings reach their lowermost positions.

Figure 38:
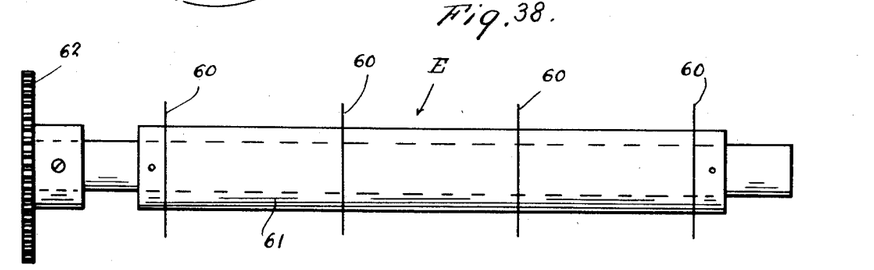
Figure 38 is a view of the circular knife carrying roller used with the ravioli machine.
Figure 39:
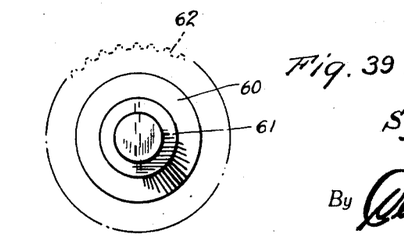
Figure 39 is an end view of Figure 38, with the gears shown in dotted lines.

When the machine is to be used for forming ravioli, the dough is rolled between the smooth rollers arranged as shown in Figure 4 and then the roller 25 is removed and a roller E, shown in Figure 38, substituted therefor. As shown, this roller is provided with the circular cutters 60 spaced a considerable distance apart by the spacers 61 and said roller is provided with a gear 62 for meshing with the gear 8 of roller 7 or 7'. A roller F, carrying a single longitudinally extending knife 63, is placed in the bearing members 17 and held therein by the bushings 38. The knife 63 is attached to the shaft 64 of the device F by means of the collars 65 attached to the shaft and having lugs 66 thereon to which the knife is connected. This shaft 64 has a gear 62' attached thereto for meshing with the gear 8 so that when the handle 10 is turned, the parts will be operated. This device will first cut the sheets of dough into wide strips through means of the disk cutter E and then as the strips are engaged by the knife 63, the strips are cut into blocks so as to produce ravioli dough.

Thus it will be seen that I have provided a simple form of machine, the parts of which can be easily changed to produce sheets of dough and then the dough cut into narrow lengths to form long-cut macaroni, and by using the cutter C, the long strips can be cut to produce short-cut macaroni. By using the device D gnocchi dough can be formed and by using the cutters F and E, ravioli may be formed.

It is thought from the foregoing description that the advantages and novel features of the invention will be readily apparent.

It is to be understood that changes may be made in the construction and in the combination and arrangement of the several parts, provided that such changes fall within the scope of the appended claims.

What I claim is:—

1. An apparatus of the class described comprising a base, a frame rising therefrom and having bearings at its upper end, a roller supported in said bearings, said end members having circular openings therein located to one side of the bearing carrying parts and each member having a slot passing from the top thereof into the opening, a rotary member having end parts adapted to be passed through the slots into said openings, a small frame having split tubular parts arranged in said openings, whereby said small frame can be rocked, said small frame having bearing recesses therein, which, when said small frame is in a certain position, will be located above the bearings first mentioned, a rotary member having its trunnions adapted to be placed in the bearing recesses of the small frame, springs against which the trunnions are held by the small frame, and means for applying pressure to the small frame to adjust the last mentioned rotary member toward or away from the roller.

2. An apparatus of the class described comprising a main frame including end members having bearings at their upper ends, a roller having its trunnions arranged in said bearings, said end members having upwardly and outwardly extending portions at their upper ends each having a circular opening therein and a slot passing from the top thereof into the opening, split sleeves rotatably arranged in the openings, L-shaped arms connected with the sleeves, means for connecting the arms together, each arm having a bearing recess therein, springs connected with the top of the end members, a rotary member having its trunnions adapted to be placed in the recesses and to rest on the springs, arms pivoted to the upper ends of the end members, screws carried thereby for holding the L-shaped arms in operative position and for holding the rotary member above the roller, another rotary member having bushings rotatably arranged thereon, said bushings having flat portions adapted to pass through the slots into the openings after which the bushings are turned to hold them in the openings and means for communicating motion to the rotary members when one of the said members is turned.

3. An apparatus of the class described comprising an upright frame including two end members, each having a bearing at its upper end, a roller having its trunnions journaled in the bearings, a pair of gears on one of the trunnions, a handle adapted to be attached to one trunnion for rotating the roller, each end member having an upwardly and outwardly extending part having a circular opening therein and a slot passing from the upper portion into the opening, a pair of L-shaped arms, each having a split sleeve at one end thereof for rotatably fitting in the opening, means for connecting the two arms together, each arm having a bearing recess therein, a spring at the upper end of each end member, a shaft having its trunnions fitting in the recesses and resting on the springs when the L-shaped arms are in operative position, means for applying pressure to the arms to adjust the shaft toward or away from the roller, a bushing for fitting in each opening, said bushing having flat sides for passing through the slots, a shaft passing through the bushing, and gears connecting the shafts with the gears on the roller.

4. An apparatus of the class described comprising a frame including end members, a roller rotatably arranged in the upper portions of said end members, means for supporting a second roller in the frame above the first roller, means for supporting a blade carrying member at one side of the first mentioned roller to cut material passing between said rollers, said blade carrying roller including a shaft, radiating wings carried by the shaft, knives carried by the shaft for spacing the wing carrying members apart and a yoke member carried by the shaft and having its bight of arcuate shape.

5. In a device of the class described, a shaft having a plurality of hubs thereon, knives spacing the hubs apart and each hub having radiating wings thereon, the outer ends of which curve in the same direction and a yoke-shaped member carried by the shaft and having an arcuate shaped bight through which the wings pass.

SYLVESTER PATT.